Dec. 9, 1924.
E. H. BOWSER
SUCKER ROD JOINT
Filed March 20, 1924
1,518,960
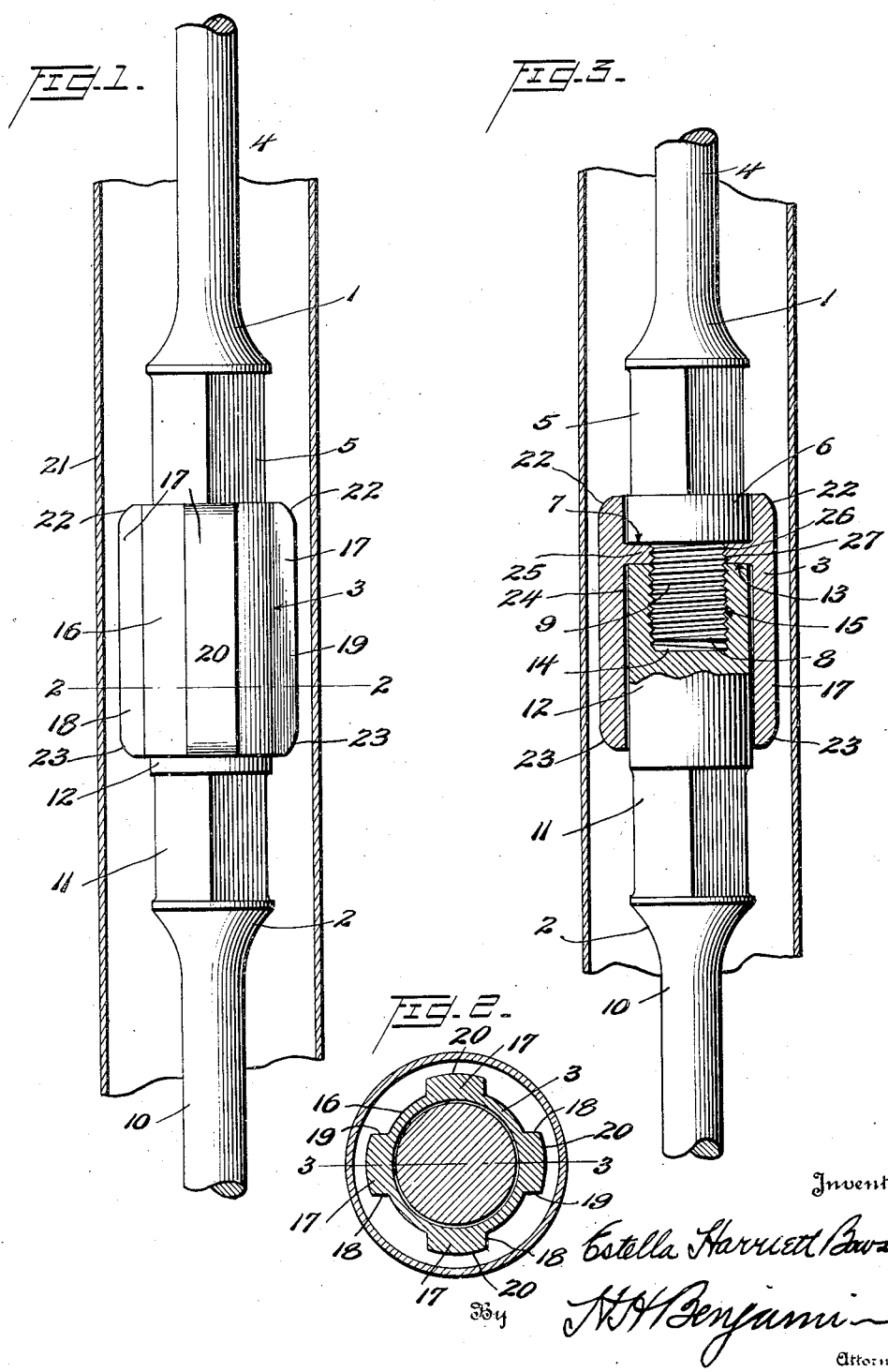

Patented Dec. 9, 1924.

1,518,960

UNITED STATES PATENT OFFICE.

ESTELLA HARRIETT BOWSER, OF EL DORADO, ARKANSAS.

SUCKER-ROD JOINT.

Application filed March 20, 1924. Serial No. 700,599.

*To all whom it may concern:*

Be it known that I, ESTELLA HARRIETT BOWSER, a citizen of the United States, residing at El Dorado, in the county of Union and State of Arkansas, have invented certain new and useful Improvements in Sucker-Rod Joints, of which the following is a specification.

My invention relates to rod joints and more particularly to the joints of the so-called "sucker rods" of oil wells.

As the well is drilled, lengths of pipe two or more inches in internal diameter are lowered into the well, these pipes being screwed together, the pipe often reaching a length of several hundred feet. Within this pipe the sucker rod reciprocates.

Because of the great length of these well pipes and because of difference in geological strata through which the pipes pass, these pipes are seldom perfectly straight and as a result there is a great deal of friction between the internal bore of the pipe and the sucker rods. This friction tends to rapidly wear out the pipe and also the rods, and especially to wear out and break the latter at the joints, these joints in order to obtain a rod of uniform strength being commonly enlarged at the joint, and it is at these enlargements that the greatest wear upon the rods takes place. The breaking of a sucker rod joint during use in the well is a serious matter not only because of the loss of material but because in order to remove and repair the rod it is frequently necessary to resort to a "fishing job" which sometimes halts all other work at the well for many hours.

Sucker rods as commonly used in oil wells are a standard article of manufacture, and usually consist of a relatively long, cylindrical shank, which is enlarged and usually squared (for a wrench grip) at each extremity. Within the enlarged portion at one end is an internally screw-threaded socket, and extending beyond the enlarged portion at the other end is an externally screw-threaded projection adapted to be screwed into the socket of an adjoining rod.

Many attempts have been made to protect the rod at the joint and many attachments have been devised to protect the rod at these points and also to reduce the friction of the rod against the pipe.

Among the attachments which have been devised for this purpose are guides carrying anti-friction rollers or balls to form bearings for the rod upon the surface of the pipe. The guides while reducing the friction and preventing wear upon the rod joints are relatively complicated and expensive pieces of mechanism, easily injured in the rough usage to which they are subjected and, when so injured, difficult to repair with the facilities available at most oil wells, with the result that, when injured, they are discarded, and as the greater part of their cost is in the labor in producing and assembling the parts, when discarded they are practically a total loss.

Another attachment which has been devised to prevent wear upon the joints is a short coupling section, intended to be inserted between the ordinary rod sections, this coupling section usually being of greater diameter than the rod, and often carrying projecting anti-friction devices or material to reduce the friction. These merely substitute wear on the coupling member for wear upon the rod and as their use, doubles the number of joints it doubles the labor of coupling and uncoupling the rods.

Another attachment which has been devised for preventing wear at the joint is a collar which is placed around the projecting screw-threaded end of one rod and, when the socket end of the next rod is screwed thereto, is gripped between the enlarged portions of the rod. This construction has the disadvantage that in order to accommodate the height of the collar, the threaded projection at one end of the rod must be made unusually long, necessitating the use of a special rod, or if a standard rod is used, preventing sufficient engagement of the threaded projection of one rod with the threaded socket of the next, to make a secure joint. Furthermore, because with this construction the enlarged ends of the rod can not be fitted tightly together with the result that water is likely to enter the thread grooves and rust the threads together making disassembling extremely difficult.

So far as I am aware, none of the attachments has come into any considerable use in oil well work, due no dobut to the objectionable features mentioned.

An object of my invention, therefore, is to provide an attachment for sucker rods which will not have these objectionable features.

Another object of my invention is to provide a sucker rod joint attachment devised to be used with standard sucker rod sections without modification of the sections.

A further object of my invention is to provide an attachment which will enclose the ends of the rods and will be held firmly in such position as to enclose the joint.

A further object of my invention is to provide an attachment which may be secured to the end of an ordinary sucker rod section and retained in place until worn out, whereby the labor of assembling and disassembling the rods is not substantially increased by the use of the attachment.

A further object of my invention is to provide an attachment of relatively soft, malleable metal, which will not score and consequently wear the pipe in which the rod operates.

A further object of my invention is to provide such an attachment with radial ribs to receive the wear caused by friction against the pipe, and by their obliteration due to wear, to give an easily recognized indication that such attachment should be replaced.

A further object of my invention is to provide such an attachment as can be easily produced by a simple casting and boring operation in which a large proportion of the cost of the device is in the material used and not in the labor required to produce it, and of material easily re-worked so that there will be no loss of material other than that which is actually worn away by friction.

A further object of my invention is to provide such an attachment of relatively soft material with a part adapted to be interposed between the enlarged portions of the rod and slightly compressed, whereby a liquid tight joint is formed which will protect the threaded portions of the joint from rust.

An embodiment of my invention is illustrated in the accompaanying drawings and while this embodiment I believe to be the best which I have so far devised, it is to be understood that other and different embodiments may be made within the scope of the annexed claims without departing from the spirit of my invention.

In the drawings:

Figure 1 is an elevation of the device within a pipe.

Figure 2 is a section on line 2—2 of Fig. 1.

Fig. 3 is a section on line 3—3 of Fig. 2.

1 is the lower end of a sucker rod.

2 is the upper end of a similar rod.

3 is a collar for the rod joint.

The rod 1 is preferably provided at its lower end with a cylindrical shank 4, an enlarged squared section 5, a cylindrical flange 6 forming a shoulder 7, a projection 8, said projection having a screw thread 9.

The rod 2 is preferably provided at its upper end with a cylindrical shank 10, an enlarged, squared section 11, a cylindrical flange 12 forming a shoulder 13, a socket 14 within the rod, said socket provided with an internal thread 15 adapted to co-operate with the thread 9 of the rod 1.

These rods are usually made of steel or iron and as so far described are the usual standard sucker rods used in oil wells.

The collar 3 is preferably made of malleable metal such as hard babbitt, soft brass or copper, although other materials having the general properties of these metals as to softness and plasticity may be used if desired.

The collar 3 has a cylindrical wall 16 of a height preferably sufficient to extend from about the upper part of flange 6 to the lower part of the flange 12 when the rods are screwed tightly together.

Upon the outer surface of the wall 16 are longitudinal, radial ribs 17, four being shown, these ribs having side walls 18 and 19, and an end wall 20, the latter relatively broad and slightly rounded and adapted to form the bearing surface of the collar against the pipe 21 in which the sucker rod reciprocates. The ends of the ribs 17 are preferably rounded off as at 22 and 23 to permit the ribs to ride over rough places and joints in the pipe.

Extending around the interior wall 24 of the collar 3 and preferably close to the upper edge thereof, is an internal flange 25 closing the interior of the collar. The flange 25 is provided with an interior bore 26 of a diameter slightly smaller than the greatest diameter of the projection 8 of the rod 1. The bore 26 has an internal thread 27 adapted to co-operate with the thread 9 of the projection 8, whereby the collar can be screwed on to and retained by said projection 8.

The device is used as follows:

The collar 3 is screwed on to the thread of the rod 1.

The rod 2 is lowered into the pipe of the well and the threaded projection 8 screwed into the socket 14, the squared portions 5 and 11 of the rods affording wrench grips to screw the rods tightly together. The force exerted in screwing the rods together is sufficient to slightly compress the flange 25, any rough or uneven places upon the shoulders of the rods digging into the relatively soft metal of the flange, thus causing the flange to act as a washer to exclude water from the threaded portions of the rods and prevent the rods rusting together. The flange 25 also acts as a lock washer to prevent the rod sections turning and becoming accidentally unscrewed from each other. The flange 25 may be made relatively thin as the collar 3 fits snugly over the flanges 6 and 12 of the rods so that there are no twisting strains upon the flange 25 and only a shearing strain caused by friction of the ribs of the collar against the inner wall of the pipe, and as the collar is made of relatively soft material, easily scored, this shearing strain is ordinarily slight. Should, however, the collar meet with an obstruction which halts its movement, because of the relative thinness of the flange 25, the collar will be sheared off before a sufficient strain is put upon the rods to buckle or break them.

The collar may be packed with grease or other water repellant if desired, but because the collar below the flange 25 forms a bell which will trap air, water will be excluded and prevented from reaching the threads of the rods.

Friction against the inner wall of the pipe gradually wears away the ribs 17 of the collar and, when a rib has become worn down to the general level of the outer surface of the collar, it gives a clear indication to the workman in charge that the collar should be renewed. Renewing is accomplished by unscrewing the rods and replacing the old collar by a new one.

The worn out collars are preserved and, when a sufficient quantity have collected, they are melted down and recast. As the collars may be produced by a simple casting and boring operation, the labor cost of making them is relatively slight as compared with the value of the material and as the only loss of material is that actually worn away by friction, and the remaining material can be used over and over again, the cost of equipping the sucker rods with this device is relatively small.

Having thus described my invention and the method of using the same, I claim:

1. A coupling for sucker rods and the like, comprising two engaging screw-threaded members, a collar enclosing the extremities of said members, and an internal flange upon said collar, having an inner thread to cooperate with the thread upon one of said members.

2. A coupling for sucker rods and the like, comprising a member with a shoulder and an external screw thread upon said member, projecting beyond said shoulder, a second member and an internal screw-threaded socket within said member adapted to co-operate with the screw thread of the first member, a collar enclosing the extremities of said members, and an internal flange upon said collar, having an inner thread to co-operate with the thread upon said first member.

3. As an article of manufacture, a collar for sucker rod joints and the like, comprising a hollow, cylindrical collar, said collar provided with radial, longitudinal ribs, and an internal flange within said collar, said flange provided with a central screw-threaded bore.

In testimony whereof I affix my signature.

ESTELLA HARRIETT BOWSER.